(12) United States Patent
Miller

(10) Patent No.: US 6,578,666 B1
(45) Date of Patent: Jun. 17, 2003

(54) PORTABLE SAFETY LADDER ASSEMBLY FOR A TRUCK TRAILER

(76) Inventor: Ronald K. Miller, 47480 Metz Rd., New Waterford, OH (US) 44445

(*) Notice: Subject to any disclaimer, the term of this patent is extended or adjusted under 35 U.S.C. 154(b) by 0 days.

(21) Appl. No.: 10/080,966

(22) Filed: Feb. 25, 2002

(51) Int. Cl.$^7$ ............... E06C 5/00; E06C 7/18; B60R 3/00
(52) U.S. Cl. ............ 182/127; 280/163; 182/206; 182/106
(58) Field of Search ............... 182/127, 106, 182/206, 91, 92, 150, 88, 228.1–228.6; 280/163, 165, 166; 296/62

(56) References Cited

U.S. PATENT DOCUMENTS

| | | | | |
|---|---|---|---|---|
| 3,017,949 A | * | 1/1962 | Harlan | 182/92 |
| 3,741,510 A | * | 6/1973 | Barnes | 182/127 X |
| 3,858,905 A | * | 1/1975 | Peebles | 182/106 X |
| 3,865,431 A | * | 2/1975 | Zakhi | 182/150 X |
| 4,017,093 A | * | 4/1977 | Stecker, Sr. | 280/163 |
| 4,199,041 A | * | 4/1980 | Gutner | 182/206 |
| 4,492,286 A | * | 1/1985 | Lemire | 182/93 |
| 4,825,975 A | * | 5/1989 | Symes | 182/92 |
| 5,024,292 A | * | 6/1991 | Gilbreath et al. | 182/90 |
| 5,236,062 A | * | 8/1993 | Laney | 182/127 |
| 5,687,813 A | * | 11/1997 | Bensch | 182/127 |
| 5,964,317 A | * | 10/1999 | Lattavo | 182/127 |
| 6,003,633 A | * | 12/1999 | Rolson | 182/127 |

* cited by examiner

Primary Examiner—Alvin Chin-Shue
Assistant Examiner—Hugh B. Thompson

(57) ABSTRACT

A portable ladder assembly for a truck trailer for users to climb on and off truck trailers. The portable ladder assembly for a truck trailer includes a support assembly including bracket members being adapted to mount upon side rails of a truck trailer; and also includes a ladder assembly being attached to the bracket members and including elongate side members being spaced apart, and also including rung members interconnecting the elongate side members and being spaced along the elongate side members; and further includes railing members being attached to the support assembly for aiding a user moving upon the ladder assembly.

2 Claims, 4 Drawing Sheets

PORTABLE SAFETY LADDER ASSEMBLY FOR A TRUCK TRAILER

BACKGROUND OF THE INVENTION

1. Field of the Invention

The present invention relates to portable ladders for truck trailers and more particularly pertains to a new portable ladder assembly for a truck trailer for users to climb on and off truck trailers.

2. Description of the Prior Art

The use of portable ladders for truck trailers is known in the prior art. More specifically, portable ladders for truck trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,024,292; 6,003,633; 3,882,965; 4,492,286; 3,563,342; and U.S. Pat. No. Des. 359,134.

While these devices fulfill their respective, particular objectives and requirements, the aforementioned patents do not disclose a new portable ladder assembly for a truck trailer. The prior art describes inventions having ladders including rungs and also including mounting members for securing the ladders to the truck trailers.

SUMMARY OF THE INVENTION

The general purpose of the present invention, which will be described subsequently in greater detail, is to provide a new portable ladder assembly for a truck trailer which has many of the advantages of the portable ladders for truck trailers mentioned heretofore and many novel features that result in a new portable ladder assembly for a truck trailer which is not anticipated, rendered obvious, suggested, or even implied by any of the prior art portable ladders for truck trailers, either alone or in any combination thereof. The present invention includes a support assembly including bracket members being adapted to mount upon side rails of a truck trailer; and also includes a ladder assembly being attached to the bracket members and including elongate side members being spaced apart, and also including rung members interconnecting the elongate side members and being spaced along the elongate side members; and further includes railing members being attached to the support assembly for aiding a user moving upon the ladder assembly. None of the prior art includes railing members and the support assembly of the present invention.

There has thus been outlined, rather broadly, the more important features of the portable ladder assembly for a truck trailer in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new portable ladder assembly for a truck trailer which has many of the advantages of the portable ladders for truck trailers mentioned heretofore and many novel features that result in a new portable ladder assembly for a truck trailer which is not anticipated, rendered obvious, suggested, or even implied by any of the prior art portable ladders for truck trailers, either alone or in any combination thereof.

Still another object of the present invention is to provide a new portable ladder assembly for a truck trailer for users to climb on and off truck trailers.

Still yet another object of the present invention is to provide a new portable ladder assembly for a truck trailer that is easy and convenient to securely mount upon a truck trailer.

Even still another object of the present invention is to provide a new portable ladder assembly for a truck trailer that increases safety for users climbing on and off truck trailers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
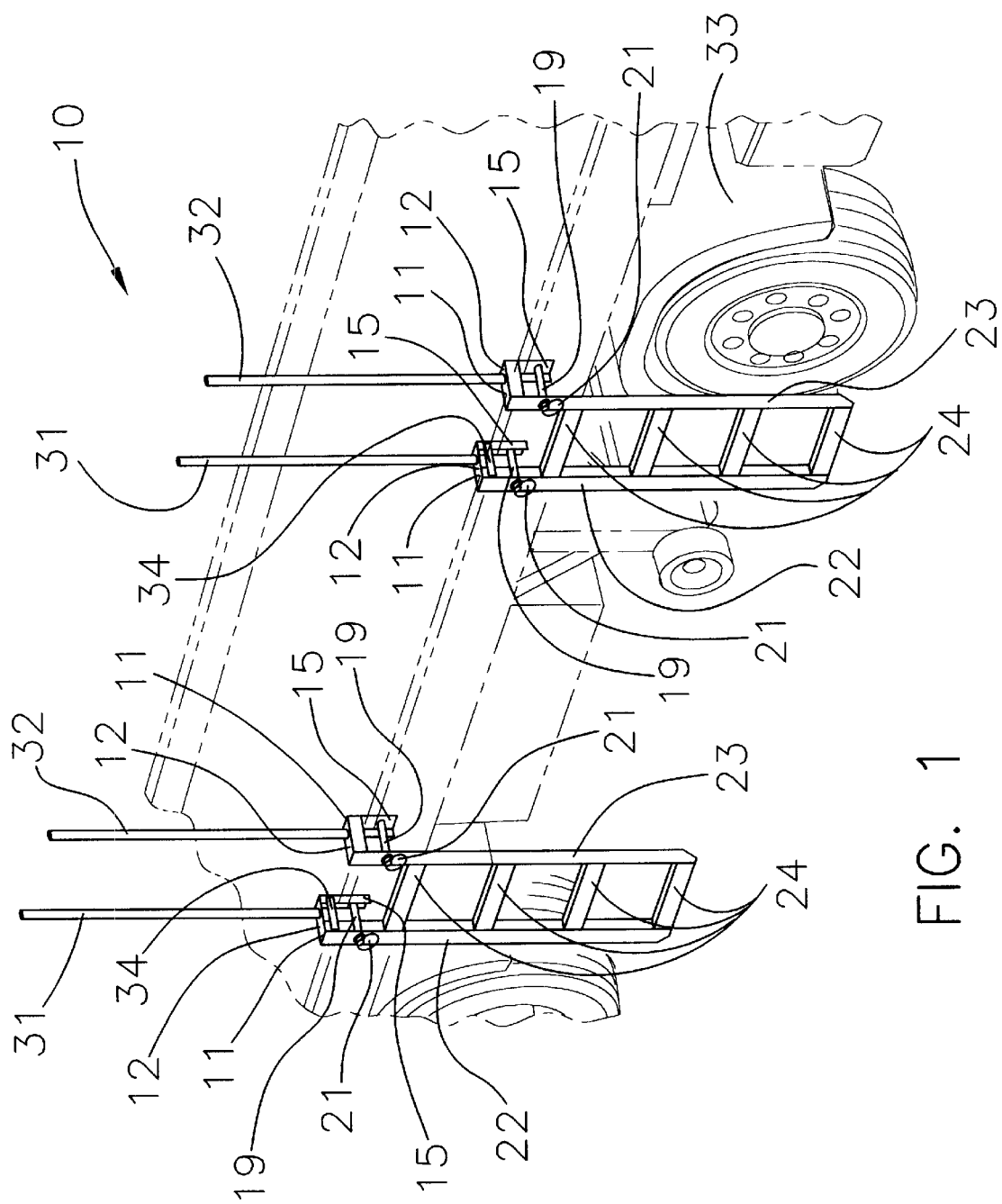
FIG. 1 is a perspective view of a new portable ladder assembly for a truck trailer according to the present invention and shown in use.
Figure 2:
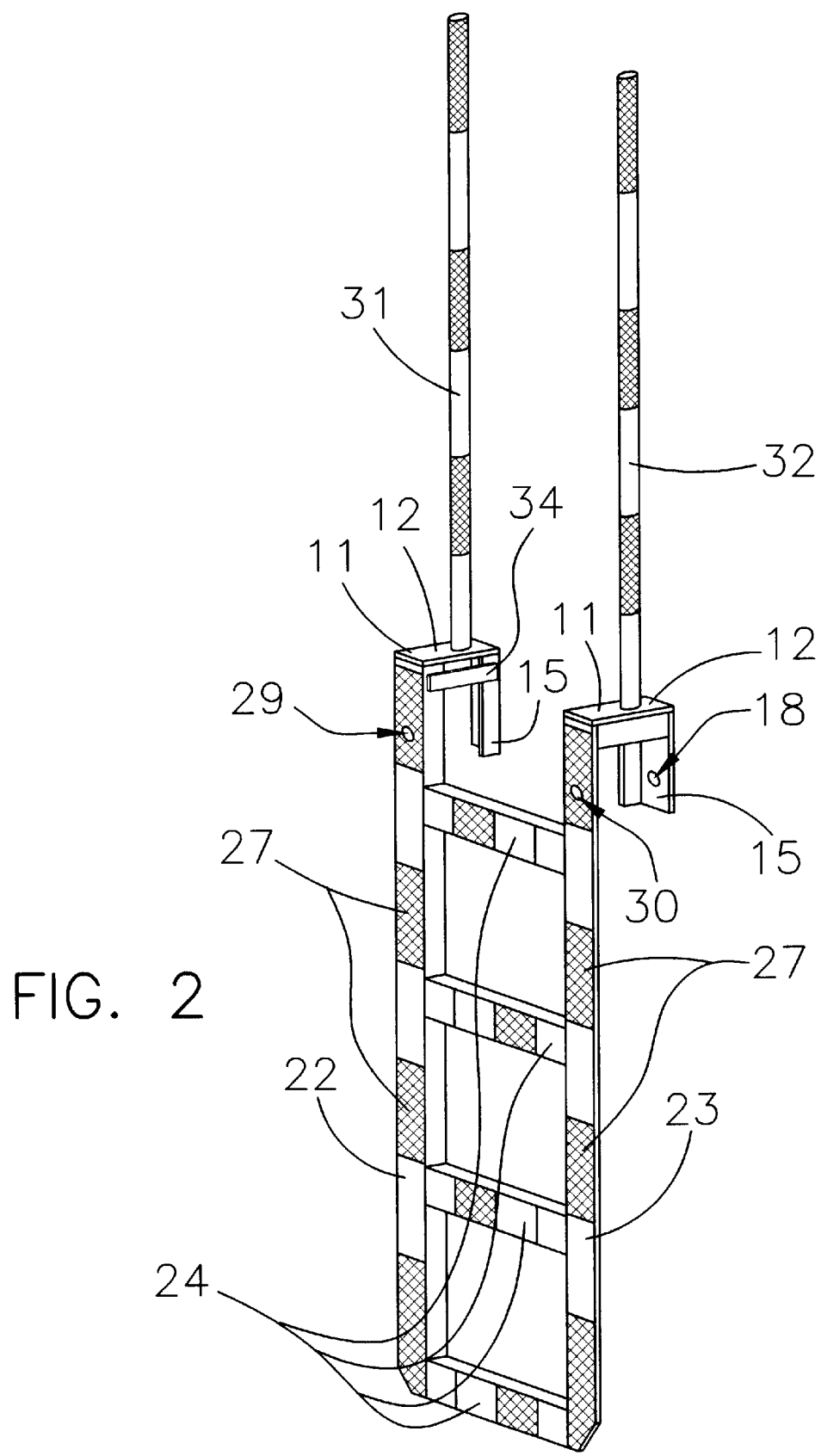
FIG. 2 is another perspective view of the present invention.
Figure 3:
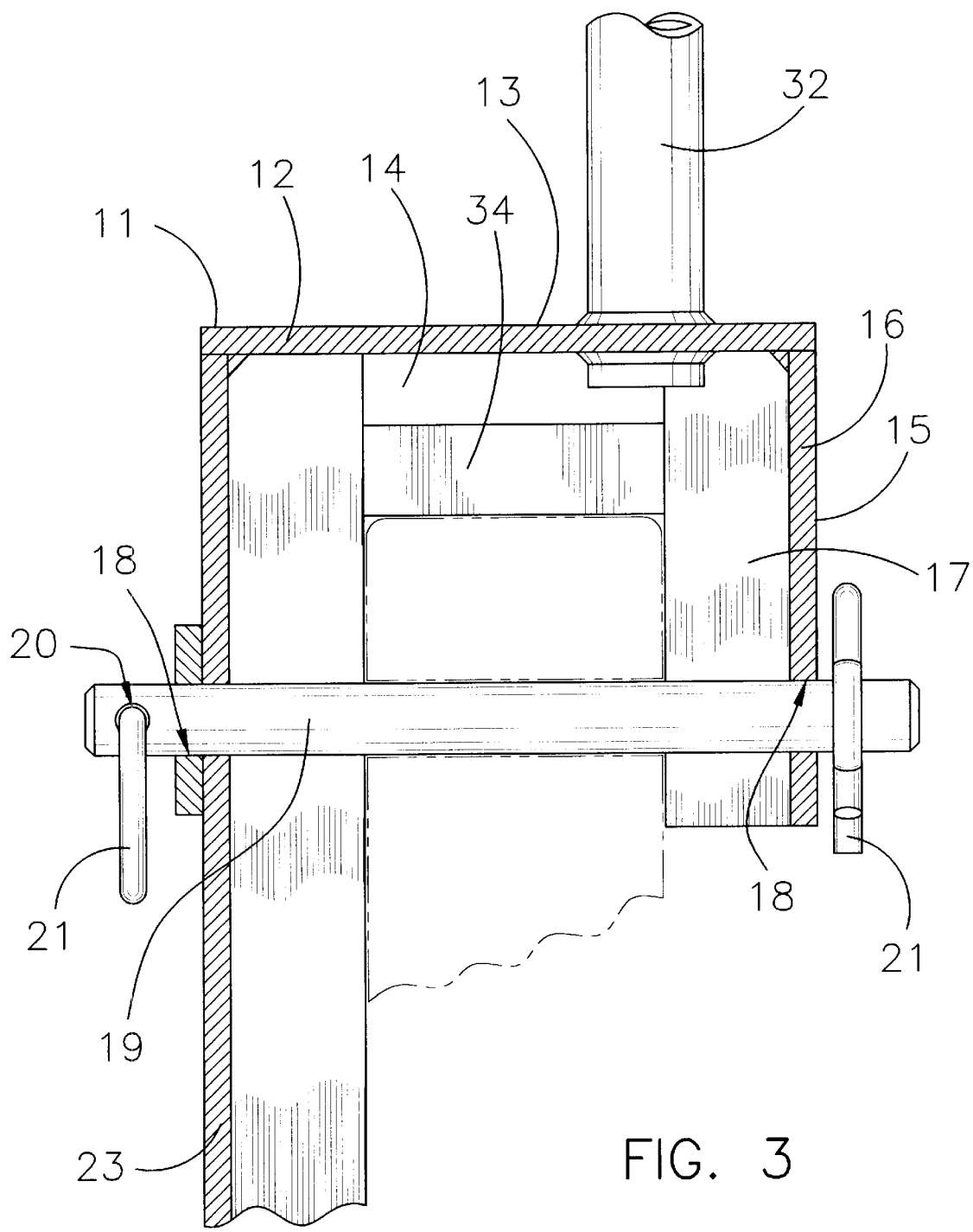
FIG. 3 is a side elevational view of the present invention.
Figure 4:
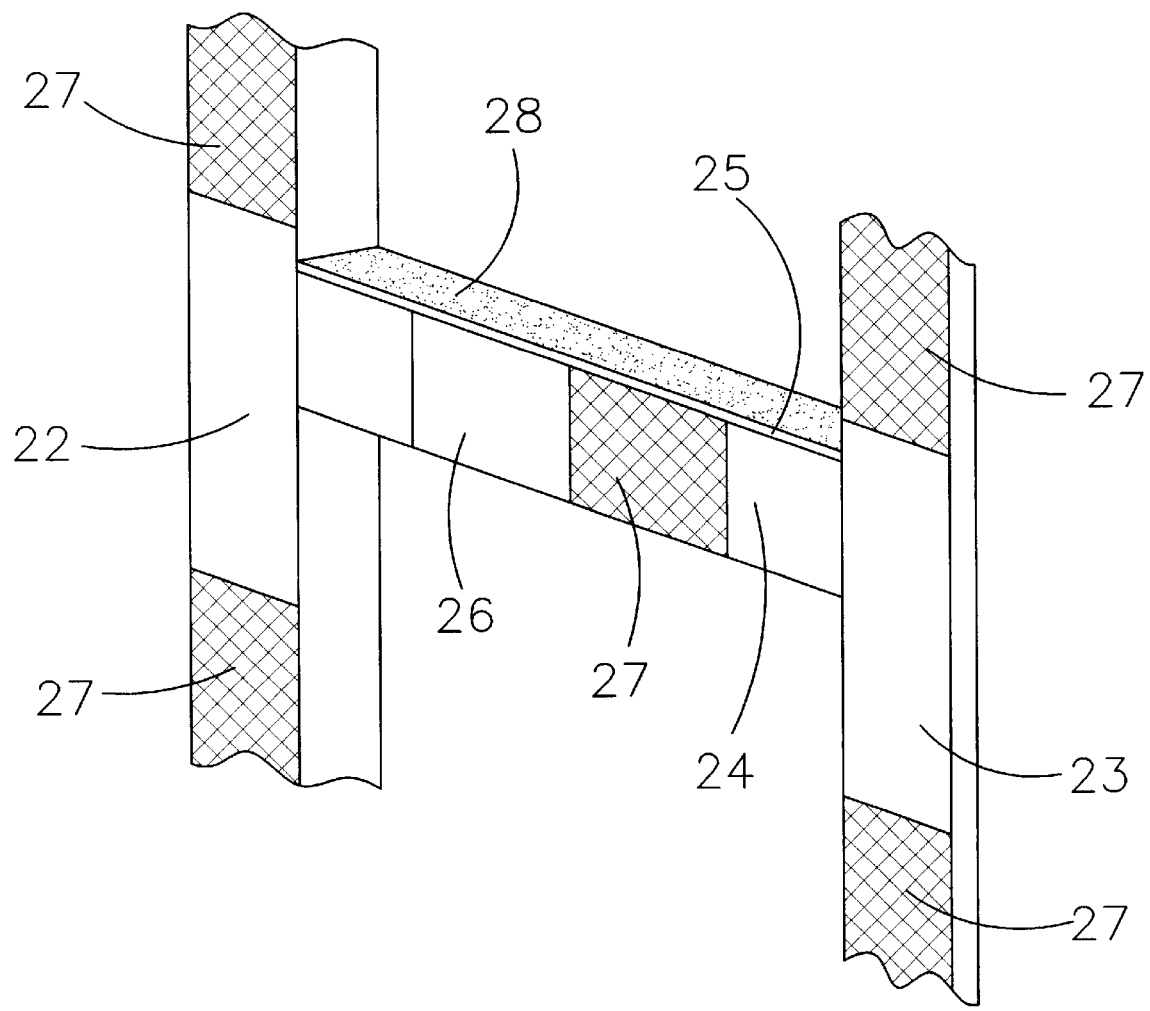
FIG. 4 is a detailed partial perspective view of the ladder member of the present invention.

With reference now to the drawings, and in particular to FIGS. 1 through 4 thereof, a new portable ladder assembly for a truck trailer embodying the principles and concepts of the present invention and generally designated by the reference numeral 10 will be described.

As best illustrated in FIGS. 1 through 4, the portable ladder assembly for a truck trailer 10 generally comprises a support assembly including bracket members 11 being adapted to mount upon side rails of a truck trailer 33. Each of the bracket members 11 includes a first support member 12, and also includes a second support member 15 being perpendicularly and conventionally attached at a first end of the first support member 12, and further includes a brace member 34 being conventionally attached and welded to the second support member 15. Each of the first and second support members 12,15 includes a first longitudinal portion 13,16 and a second longitudinal portion 14,17 being angled generally perpendicular to the first longitudinal portion 13,16 with each of the first longitudinal portions 13,16 of the second support members 15 having a hole 18 extending therethrough. The support assembly further includes elongate fastening members 19 being extendable through the holes 18 of the second support members 15 and having bores 20 extending laterally therethrough near ends thereof, and also includes retainer members 21 being removably and securely extended through the bores 20 of the elongate fastening members 19.

A ladder assembly is conventionally attached and welded to the bracket members 11 and includes elongate side members 22,23 being spaced apart, and also includes rung members 24 conventionally interconnecting the elongate side members 22,23 and being spaced along the elongate side members 22,23. Each of the elongate side members 22,23 has top ends which are securely and conventionally attached and welded to a first end of a respective one of the first support members 12. The elongate side members 22,23 depend generally perpendicularly from the first support members 12. Each of the rung members 24 has a top longitudinal plate-like portion 25 and a side longitudinal plate-like portion 26 which is angled generally perpendicularly to the top longitudinal plate-like portion 25. The ladder assembly further includes conventional strips of light reflective material 27 being securely and conventionally attached to the elongate side members 22,23 and to the side longitudinal plate-like portions 26 of the rung members 24, and also includes conventional strips of non-slip material 28 being securely and conventionally attached to top surfaces of the top longitudinal plate-like portions 25 of the rung members 24. Each of the elongate side members 22,23 has a hole 29,30 extending therethrough near the top ends thereof. The elongate fastening members 19 are removably extended through the holes 29,30 of the elongate side members 22,23 to securely hold the bracket members 11 upon the side rails of the truck trailer 33.

Railing members 31,32 are conventionally attached and welded to the support assembly for aiding a user moving upon the ladder assembly. The railing members 31,32 are generally poles each having a bottom portion which is securely disposed through the first support members 12 and which extend upwardly therefrom. The strips of reflective material 27 are also conventionally attached about the railing members 31,32.

In use, the user places the bracket members 11 about the side rail of the truck trailer 33 and inserts the elongate fastening members 19 through the holes 18,29,30 of the second support members 15 and the elongate side members 22,23 to safely secure the ladder assembly to the truck trailer 33. The user then climbs upon the rung members 24 to get up upon the truck trailer 33. For added safety, the user grasps the railing members 31,32 while climbing upon the rung members 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the portable ladder assembly for a truck trailer. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable ladder assembly for a truck trailer comprising:

a support assembly including bracket members being adapted to mount upon side rails of a truck trailer, each of said bracket members including a first support member, and also including a second support member being perpendicularly attached at a first end of said first support member, and further including a brace member being attached to said second support member, each of said first and second support members including a first longitudinal portion and a second longitudinal portion being angled generally perpendicular to said first longitudinal portion, each of said first longitudinal portions of said second support members having a hole extending therethrough, said support assembly further including elongate fastening members being extendable through said holes of said second support members and having bores extending laterally therethrough near ends thereof, and also includes retainer members being removably and securely extended through said bores of said elongate fastening members;

a ladder assembly being attached to said bracket members and including elongate side members being spaced apart, and also including rung members interconnecting said elongate side members and being spaced along said elongate side members; and railing members being attached to said support assembly for aiding a user moving upon said ladder assembly.

2. A portable ladder assembly for a truck trailer comprising:

a support assembly including bracket members being adapted to mount upon side rails of a truck trailer, each of said bracket members including a first support member, and also including a second support member being perpendicularly attached at a first end of said first support member, and further including a brace member being attached to said second support member, each of said first and second support members including a first longitudinal portion and a second longitudinal portion being angled generally perpendicular to said first longitudinal portion, each of said first longitudinal portions of said second support members having a hole extending therethrough;

a ladder assembly being attached to said bracket members and including elongate side members being spaced apart, and also including rung members interconnecting said elongate side members and being spaced along said elongate side members; and railing members being attached to said support assembly for aiding a user moving upon said ladder assembly, said railing members being generally poles each having a bottom portion which is securely disposed through said first support members and extending upwardly therefrom.

* * * * *